(12) United States Patent
Buervenich et al.

(10) Patent No.: US 6,665,572 B2
(45) Date of Patent: Dec. 16, 2003

(54) METHOD AND DEVICE FOR OPERATING AN INSTALLATION OF A PRIMARY INDUSTRY

(75) Inventors: Hans-Peter Buervenich, Erlangen (DE); Gerhard Dachtler, Baiersdorf (DE); Thomas Glass, Duesseldorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/284,142

(22) Filed: Oct. 31, 2002

(65) Prior Publication Data

US 2003/0078689 A1 Apr. 24, 2003

Related U.S. Application Data

(63) Continuation of application No. PCT/DE01/03505, filed on Sep. 12, 2001.

(30) Foreign Application Priority Data

Sep. 25, 2000 (DE) .......................................... 100 47 381

(51) Int. Cl.[7] ................................................ G06F 19/00
(52) U.S. Cl. ........................ 700/103; 700/95; 700/100; 700/146; 700/28
(58) Field of Search ............................ 700/95, 97, 100, 700/101, 145–149, 28

(56) References Cited

U.S. PATENT DOCUMENTS

| 4,658,363 | A | * | 4/1987 | Tippins et al. ............... 700/148 |
| 4,958,292 | A | | 9/1990 | Kaneko et al. |
| 5,787,000 | A | * | 7/1998 | Lilly et al. ..................... 700/95 |
| 6,029,097 | A | * | 2/2000 | Branicky et al. ........... 700/146 |
| 6,112,394 | A | * | 9/2000 | Seidel et al. ............. 29/407.01 |
| 6,272,391 | B1 | * | 8/2001 | Maturana et al. ........... 700/103 |

FOREIGN PATENT DOCUMENTS

WO   WO 00/05014 A1   2/2000

* cited by examiner

*Primary Examiner*—Jayprakash N. Gandhi
(74) *Attorney, Agent, or Firm*—Sughrue Mion, PLLC

(57) ABSTRACT

A method and a device for operating an installation of a primary industry, particularly a continuous casting and rolling installation, using a computer system. Products assigned to different production orders are produced in the installation, and a production plan is generated using method steps for order selection, pre-planning, planning and optimization.

15 Claims, 3 Drawing Sheets

15 Order Selection
17 Planning

18 Planning
20 Optimization

1 Continuous Casting Installation
2 Steel Mill
3 Electric Arc Furnace
4 Ladle Furnace
5 Vacuum Degassing Unit
6 Continuous Casting Unit
7 Ladle Turret
8 Continuous Caster
9 Rolling Installation
10 Equalizing Furnace
11 Hot Rolling Mill 1 Continuous Casting Installation
2 Steel Mill
3 Electric Arc Furnace
4 Ladle Furnace
5 Vacuum Degassing Unit
6 Continuous Casting Unit
7 Ladle Turret
8 Continuous Caster
9 Rolling Installation
10 Equalizing Furnace
11 Hot Rolling Mill

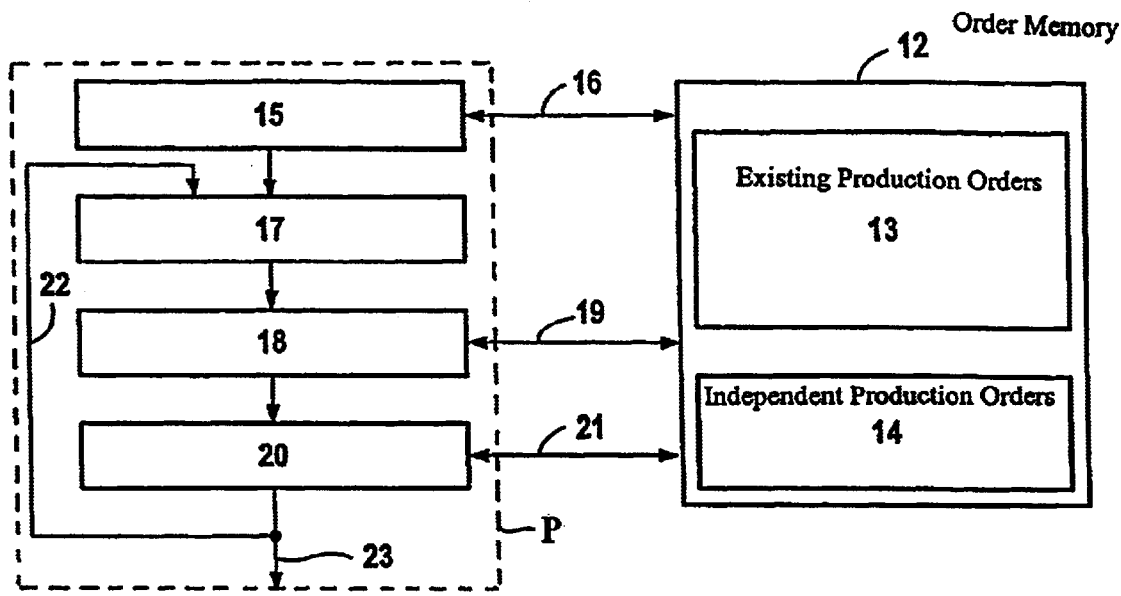
FIG 4
15 Order Selection  17 Planning  18 Planning  20 Optimization
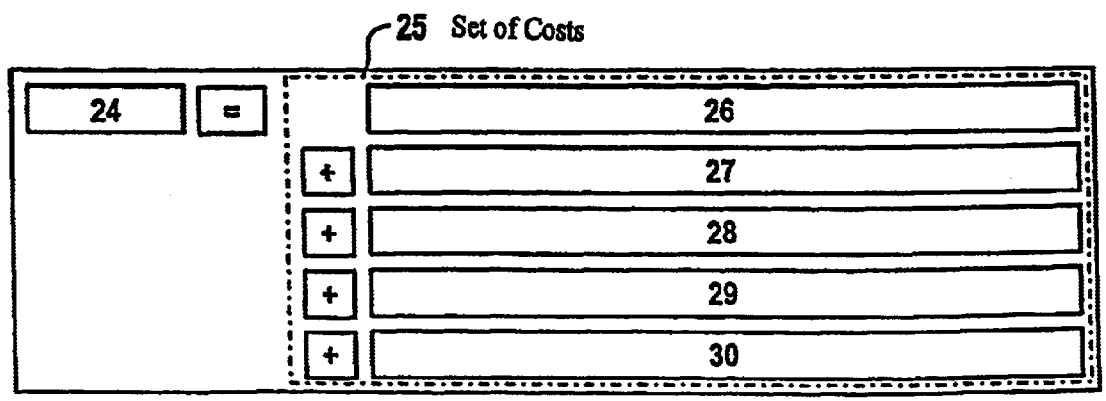
FIG 5  26 - 30 Costs

METHOD AND DEVICE FOR OPERATING AN INSTALLATION OF A PRIMARY INDUSTRY

This is a Continuation of International Application PCT/DE01/03505, with an international filing date of Sep. 12, 2001 which was published under PCT Article 21(2) in German, and the disclosure of which is incorporated into this application by reference.

FIELD OF AND BACKGROUND OF THE INVENTION

The invention relates to a method for operating an installation of a primary industry, for example a continuous casting and rolling installation, using a computer system. Products assigned to different production orders are produced in the installation and a production plan having a plurality of method steps is generated.

The invention further relates to an installation of a primary industry, for example a continuous casting and rolling installation, using a computer system. Products assigned to different production orders are produced in the installation and the computer system is used to generate a production plan.

Such methods for operating installations of a primary industry, such as continuous casting and rolling installations, and the corresponding installations are generally known and many of them are in operation.

The known installations are subject to process-related restrictions that result, for instance, from the tool life of parts of the installation. For example, the division of the operation of the continuous casting and rolling installation into individual sequences is a consequence of such process-related restrictions.

In installations in which different production orders are processed, there are order-related restrictions. In continuous casting and rolling installations, for example, these restrictions include, e.g., a desired steel brand or a desired thickness and/or a desired width of the respective end product.

It is well known that, as a consequence of these process and order-related restrictions, it is very difficult to operate the installation optimally with different production orders in a so-called production run. For example, with regard to the utilization of an installation, the process and order-related restrictions are almost diametrically opposed, so that until now it has been almost impossible to achieve optimum operation of an installation with different orders.

In addition to manual planning, which is possible only to a very limited extent, a method and device are known from the international application WO 00/05014 A1. Here, a genetic algorithm is used to generate a sequence of different production orders in an installation. This method, however, has the drawback of long processing times and limited optimization means.

OBJECTS OF THE INVENTION

One object of the invention is to provide a method for operating an installation, for example a continuous casting and rolling installation, that enables improved or even optimized operation.

Another object of the invention is to provide a device for operating an installation, for example a continuous casting and rolling installation, that enables improved or even optimized operation.

SUMMARY OF THE INVENTION

According to one formulation of the invention, these and objects are attained by a method for operating an installation of a basic industry, using a computer system, wherein products assigned to different production orders are produced in the installation, and wherein a production plan is generated by: a) generating an initial production plan from a plurality of production orders (order selection); b) generating a sequence of the production orders stored in the production plan while taking into account process-related restrictions to which the installation and the production orders are subject (preplanning); c) generating an executable production plan that takes into account the process-related restrictions to which the installation is subject (planning); and d) optimizing the executable production plan generated (optimization).

According to another formulation, the invention is directed to a device for operating an installation of a basic industry, wherein products assigned to different production orders are produced in the installation. The device includes a computer system that: generates an initial production plan from a plurality of production orders, generates a sequence of the production orders stored in the production plan, generates an executable production plan that takes into account process-related restrictions to which the installation is subject, and optimizes the generated executable production plan.

According to the invention, the initially described problem is not solved by manual entry or by using a genetic algorithm as in the prior art, but in the form of method steps of order selection, pre-planning, planning and optimization. The particular advantage of these method steps is that they require substantially less processing time and improve the planning quality attributable to the particular method used.

In the order selection, a production plan that is composed of a plurality of production orders is generated. One advantageous embodiment of order selection is that the production orders that are included in the production plan are selected as a function of commercial and technical criteria. Such commercial and technical criteria may include, among others, delivery dates of the completed product, quality data and technical data, such as width and thickness of the end product in the case of casting and rolling installations.

The purpose of preplanning is to establish a sequence of the production orders stored in the production plan while taking into account as many restrictions as possible. In preplanning, the process-related cost incurred in switching from one production order to the next production order is calculated. A sequence of the selected production orders is defined in which the cost incurred is made as low as possible. This cost is determined as a function of the process-related restrictions to which an installation is subject.

The purpose of planning is to generate an executable production plan based on the requirements of the preplanning. In planning, the sequence defined in the preplanning remains, but other products are possibly inserted in order to meet the process-related restrictions of the installation. Planning takes into account all restrictions that exist in an installation, such as roll performance in the case of continuous casting and rolling installations.

According to another advantageous embodiment, additional products are selected from production orders that had previously been omitted in the order selection.

In a further advantageous embodiment of the inventive method, if no other products from production orders are available, the additional products are determined from production-independent orders. Production-independent orders are defined, e.g., as:

a) products of expected production orders,
b) products of recurrent, i.e., continuously occurring, production orders,
c) products that are not associated with any of the aforementioned orders.

Optimization identifies points in planning that have further optimization potential. Essentially, all of these points are points in a production plan at which additional products of independent production orders were included. To avoid these products, the original order selection is influenced in such a way that a corresponding improvement can be expected. For this new order selection, preplanning and planning are re-executed. The result after optimization is then compared with the initial result. If the optimized result at the cost determined in preplanning and planning is better, then this result is used as the new production plan. An alternative procedure in the step of optimization is to accept local deteriorations in individual installation parts in order to obtain a better overall solution.

One advantageous embodiment of the invention is that deletion of at least one production order is factored into the optimization of planning.

An advantage of this procedure (using order selection, preplanning, planning and optimization) is that all the restrictions related to the sequence of two products can be handled directly in preplanning. This makes planning highly flexible regarding possible requirements dictated by additional restrictions.

A further advantage of such an approach is that it can be used for different variants of production planning, e.g., regular planning, emergency planning, as well as residual planning.

Regular planning is defined as a production plan generated over a predefined period and taking into account both throughput restrictions and process-related restrictions, as well as quality restrictions.

In emergency planning, other restrictions in addition to the regular planning restrictions are taken into account. If technical faults occur in the installation, or if parts of the installation cannot meet the technical specifications, re-planning is carried out, possibly with restricted resources or changed boundary conditions.

In residual planning, a sequence of customer orders is specified for a production plan, i.e., the steps of order selection and preplanning are carried out manually. The other steps are performed as described in planning and optimization.

Installation restrictions that are taken into account in preplanning and planning, particularly in continuous casting and rolling installations, are set out below:
a) steel production: melt weights, scrap quantities per melt, processing times;
b) continuous casting: ingot dimensions, casting rate, frame groups, width adjustment rate, setup times, scrap quantities per casting sequence;
c) tunnel furnace: processing times;
d) hot roll mill: roll performance on heating strips, restrictions on changes in thickness, width restrictions, intermediate roll changes;
e) synchronization restrictions: width and thickness synchronization in case of several production lines, which are determined by restrictions in the rolling mill, and setup time restrictions on the continuous caster;
f) order restrictions: planning limit regarding roll performance, flatness restrictions, width adjustment; and
g) downtimes of the individual units that must be taken into account.

All installations that have restrictions regarding the transition between different process runs can be described and evaluated in this manner. Based on this evaluation, the production plan that is most advantageous from a process point of view is then generated.

BRIEF DESCRIPTION OF THE DRAWINGS

The invention and further advantages and details will now be described with reference to the schematically depicted exemplary embodiments in the drawing in which:

FIG. 4 is a flow chart of an exemplary embodiment of an installation according to the invention; and FIG. 5 is an example of a process-related cost evaluation in preplanning in a continuous casting and rolling installation.

DETAILED DESCRIPTION OF THE PREFERRED EMBODIMENTS

Figure 1:
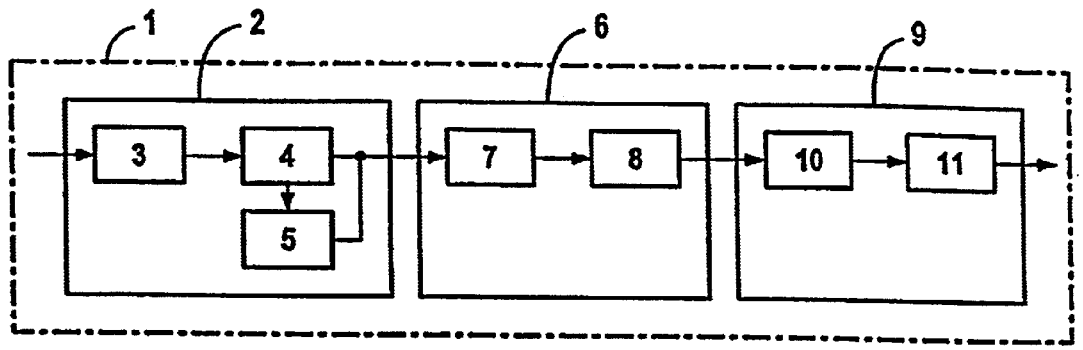
FIG. 1 is a block diagram of a single strand compact rolling mill.
Figure 2:
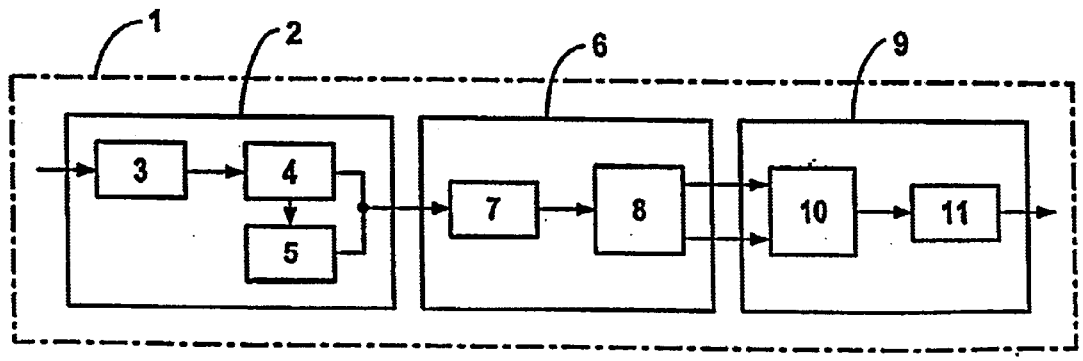
FIG. 2 is a block diagram of a twin strand compact rolling mill.
Figure 3:
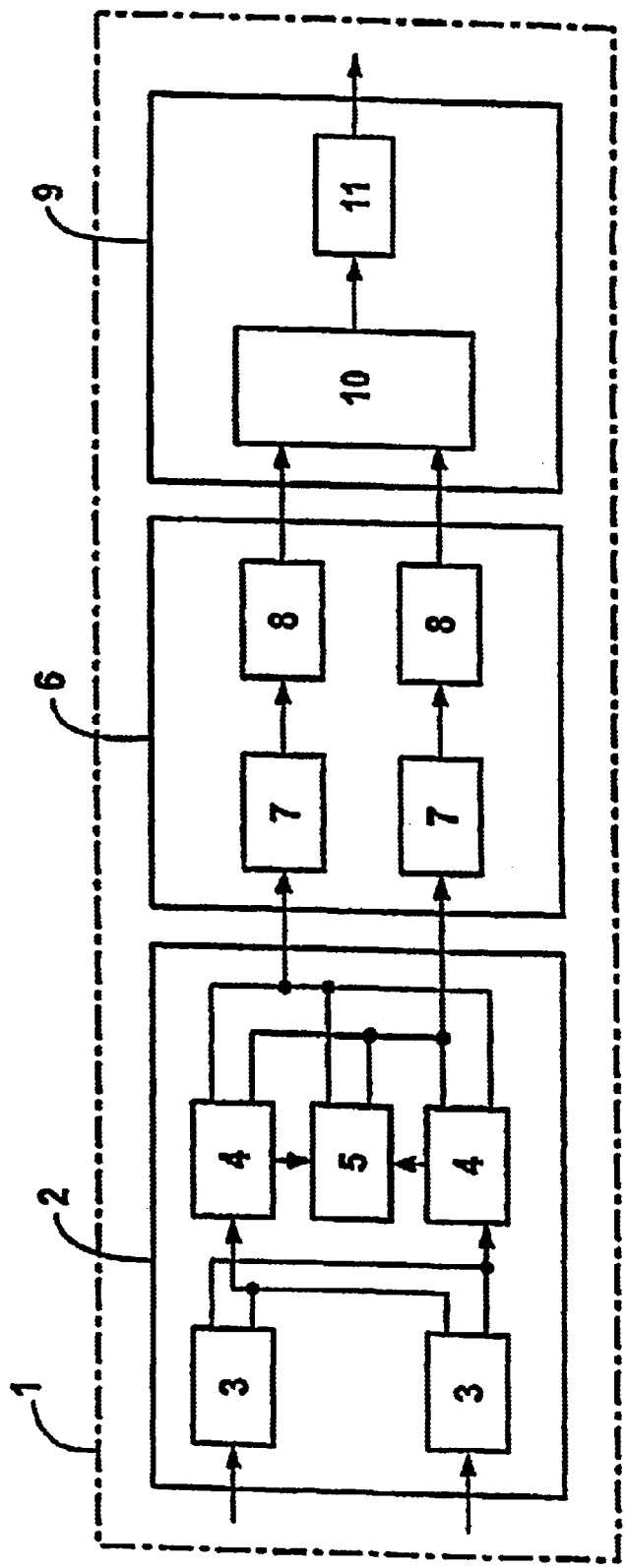
FIG. 3 is a block diagram of a compact rolling mill with a twin strand caster.

FIGS. 1 to 3 depict an installation of a basic industry (continuous casting and rolling installation) 1 in different embodiments. The continuous casting installation 1 includes a plant area for steel production, a steel mill 2, a continuous caster 6 and a rolling mill 9. In the steel mill 2 at least one electric arc furnace 3 is provided, which is charged with scrap. The scrap is melted in an electric arc furnace 3. Downstream of each electric arc furnace 3, a ladle furnace 4 is arranged. Downstream of the ladle furnace 4 is a vacuum degassing unit 5 which is used to degas the steel as a function of a desired steel brand. This is followed by a continuous casting unit 6, which is used to cast the steel into slabs. The continuous casting unit 6, in this case, is depicted in the form of a ladle turret 7 and a downstream continuous caster 8. Depending on the technical configuration, a distinction is drawn between single strand and twin strand continuous casters (see FIG. 3). A rolling installation 9 is arranged downstream of the continuous casting unit 6. The steel slabs produced in the continuous caster 8 are subsequently fed to an equalizing furnace 10. Within the equalizing furnace 10, these slabs can be buffered for at least a short period. It is also possible to give preference to individual slabs. After the equalizing furnace 10, the slabs are fed to the hot rolling mill 11. In the hot rolling mill 11, the slabs are guided through multiple roll pairs and thereby reduced in thickness. Downstream of the hot rolling mill 11, there is frequently a cold rolling mill in which the thickness of the slabs is further reduced. This cold rolling mill is not shown in the exemplary embodiments depicted in FIG. 1 to FIG. 3.

FIGS. 1 to 3, as previously mentioned, show different variants of continuous casting and rolling installations. Depending on the variant of such a continuous casting and rolling installation, different work sequences are possible or necessary.

The described parts of a continuous casting and rolling installation 1 each have a different tool life. For instance, continuous caster 8 of a continuous casting unit 6 must be cleaned, warmed up and possibly also partly replaced after a specified amount of liquid steel has passed through it. In the hot rolling mill 11 of a rolling installation 9, the rolls must be replaced after a defined length of rolled slab. This process is referred to as a roll change.

FIG 4 is a flow chart of an exemplary embodiment of a system. representative of a device for operating an installation, according to the invention. The order memory 12 comprises the existing production orders 13 and the independent production orders 14. The existing production orders 13 are defined as all the production orders that have underlying third-party purchase orders. The independent production orders 14 are orders that do not have an underlying third-party purchase order. In the order selection 15, a processor p of the computer system selects a number of production orders from the existing production orders 13 of order memory 12 as a function of commercial and technical criteria, such as delivery dates and/or the quality specifications to be satisfied. The production orders are selected and provided through a connection 16.

The selected number of production orders are transferred to the preplanning 17. The preplanning 17 generates a sequence from the production orders stored in the production plan while taking into account as many restrictions as possible. The process-related cost incurred due to the transition from one production order to the next is calculated here. The preplanning 17 determines a sequence of the selected production orders in which the process-related cost is as low as possible.

The production order sequence determined by preplanning 17 is transferred to the planning 18. The task of the planning 18 is to generate an executable production plan from the selection of the preplanning 17. The planning 18 retains the sequence defined in the preplanning 17 but may introduce other products to meet process-related restrictions of the installation. These additional products are referred to as filler products. Preferably, these filler products are selected from the existing production orders 13. If no suitable existing production orders 13 are identified in the order memory 12, the filler products are determined from the independent production orders 14. The filler products are selected via a connection 19.

The executable production plan generated in the planning 18 is transferred to the optimization 20. In the optimization 20, the points in the production plan that have additional process-related optimization potential are identified. Essentially, these are all the points in a production plan at which additional products, so-called filler products, were added. To avoid these filler products, the original order selection is manipulated in such a way that an improvement can be expected. This optimization is carried out via a connection 21 to the order memory 12. New existing production orders 13 are selected via a connection 21, or orders that had previously been selected are deleted again. The new selection is then transferred to the preplanning 17 via a connection 22, and the steps of preplanning 17 and planning 18 are repeated. Thereafter, the result of the planning 18 is transferred to the optimization 20 and compared with the initial result from the first optimization. If the optimized result at the cost determined in preplanning and planning is more favorable, this result is used as the new production plan. If no further improvement is determined in optimization 20, the generated production plan is released for production via a connection 23.

FIG 5 shows an example of a process-related cost evaluation of preplanning 17 in a continuous casting and rolling installation 1. The total cost that arises in the transition form a production order 1 a production order 2—is calculated from a set of costs 26, 27, 28, 20 and 30 representing process-related restrictions. Block 26 identifies the cost caused by a change in thickness in the transition from production order 1 to production order 2. Block 27 indicates the cost caused by the use of filler products. These filler products are necessary to obtain a permissible change in thickness. Block 28 designates the cost caused by a roll change. A roll change can be determined independently of the roll performance. Block 29 identifies the cost caused by using a new melt. A new melt is used if different steel brands are required for different products. Block 30 designates the cost incurred when flatness limits are exceeded.

With the described method, it is thus possible to quickly and easily determine the process-related costs in the transition from the production order 1 to the production order 2. Depending on the installation variant, the calculation of the process-related cost can be adjusted quickly and effectively by adding or deleting a process-related cost determined as a function of the installation restrictions.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. Method for operating an installation of a basic industry, using a computer system, wherein products assigned to different production orders are produced in the installation, and wherein a production plan is generated using method steps comprising:

a) generating an initial production plan from a plurality of production orders;
   b) generating a sequence of the production orders stored in the production plan while taking into account process-related restrictions, including process-related cost, to which the installation and the production orders are subject;
   c) generating an executable production plan that takes into account the process-related restrictions to which the installation is subject; and
   d) optimizing the executable production plan generated.

2. Method as claimed in claim 1, wherein the basic industry comprises a continuous casting and rolling installation.

3. Method as claimed in claim 1, wherein the initial production plan is generated from a plurality of production orders as a function of commercial and technical criteria.

4. Method as claimed in claim 1, wherein said step of generating the sequence of the production orders while taking into account the process-related cost to which the installation and the production orders are subject comprises minimizing the process-related cost incurred in the transition from one of the production orders to a next one of the production orders.

5. Method as claimed in claim 1, wherein said step of generating the executable production plan comprises inserting at least one of the products of at least one of the production orders into the executable production plan.

6. Method as claimed in claim 5, wherein the at least one inserted product is selected from production orders that were previously omitted in the sequence of the production orders.

7. Method as claimed in claim 5, wherein the at least one inserted product is selected from a production-independent order if no other products are available from existing production orders.

8. Method as claimed in claim 7, wherein the product which is selected from a production-independent order is a product that is contained in an expected or in a recurrent production order.

9. Method as claimed in claim 1, wherein said optimizing step comprises identifying optimizing points and modifying the original order selection, and wherein said method further comprises executing at least one additional pass through said steps b) through d).

10. Method as claimed in claim 9, wherein the optimizing points are points of products having an independent order.

11. Method as claimed in claim 9, wherein said optimizing step comprises deleting at least one of the production orders in the executable production plan.

12. Method as claimed in claim 1, further comprising carrying out emergency planning.

13. Method as claimed in claim 1, further comprising carrying out residual planning.

14. Device for operating an installation of a basic industry, wherein products assigned to different production orders are produced in the installation, comprising a computer system configured to generate an initial production plan from a plurality of production orders, to generate a sequence of the production orders stored in the production plan, to generate an executable production plan that takes into account process-related restrictions, including process-related cost, to which the installation is subject, and to optimize the generated executable production plan.

15. Device as claimed in claim 14, wherein the basic industry comprises a continuous casting and rolling installation.

* * * * *